June 10, 1930.   A. E. BECK   1,763,339
EDGE TRIMMING ATTACHMENT FOR LAWN MOWERS
Filed Nov. 10, 1928
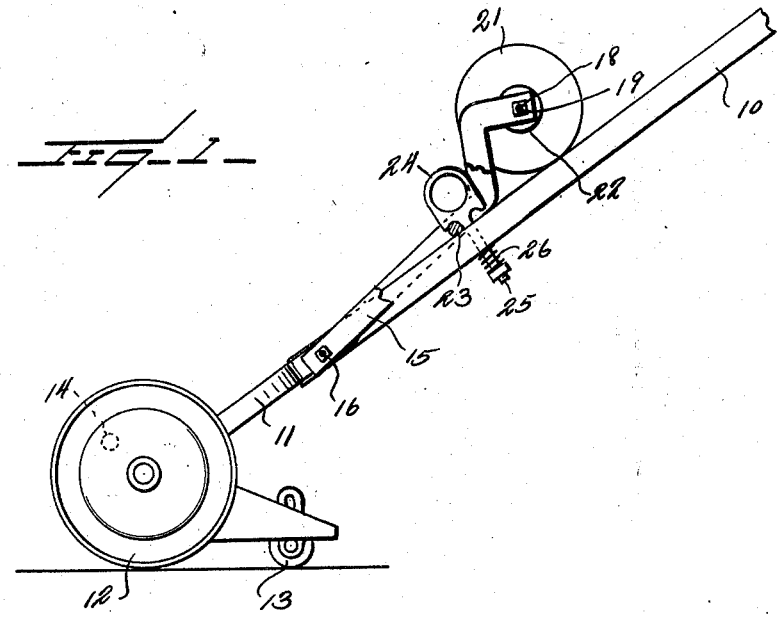
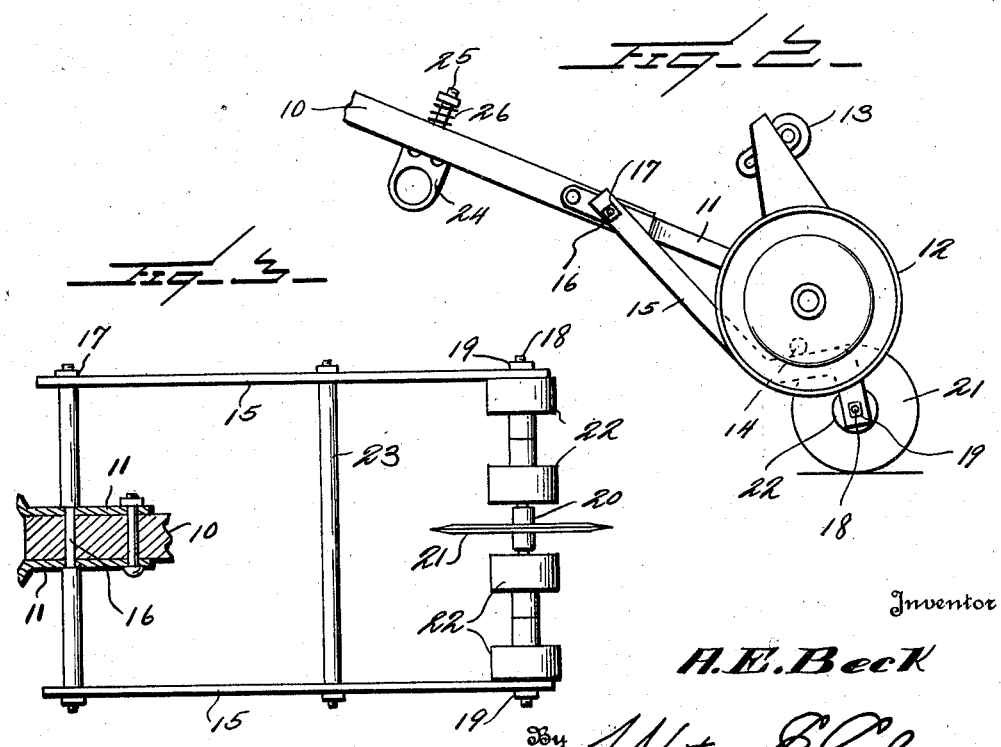
Inventor
A. E. Beck
By Watson E. Coleman
Attorney Patented June 10, 1930

1,763,339

UNITED STATES PATENT OFFICE

ANDREW E. BECK, OF SARASOTA, FLORIDA

EDGE-TRIMMING ATTACHMENT FOR LAWN MOWERS

Application filed November 10, 1928. Serial No. 318,464.

This invention relates to trimmers used in trimming the edges of lawns, gardens, paths, walks and the like and the general object of the invention is to provide a trimmer of this character which may be readily attached to a lawn mower or readily removed therefrom, which when attached to the lawn mower does not have to be removed when the mower is used for ordinary work and which will not interfere with the free trundling of the lawn mower to and from the work and which at the same time may be readily removed if necessary.

A further object is to provide a trimmer of this character which when in use is forced through the sod, at the edge of the lawn or path, by the whole weight of the mower but which is balanced against lateral canting or tilting movement by traction wheels supported upon the shaft on which the cutting disk is mounted.

Other objects will appear in the course of the following description.

My invention is illustrated in the accompanying drawings, wherein:—

Figure 1 is a side elevation of a lawn mower with my attachment applied thereto;

Figure 2 is a like view to Figure 1 showing the mower inverted and the attachment in use;

Figure 3 is a plan view of the attachment, the mower handle being shown in section.

Referring to the drawings, it will be seen that I have illustrated a lawn mower of ordinary type having the usual handle 10 extending ordinarily downward and forward and connected by the yoke bars 11 to the main axle for the traction wheels 12. The usual roller 13 is mounted upon the brackets projecting rearward from the main frame and the main frame includes the transverse rod 14, commonly found on machines of this character. All of these parts may be of any usual or suitable construction and it will be understood that I have illustrated any common and ordinary type of lawn mower.

My attachment comprises a pair of arms 15 which are pivoted upon a transverse rod 16 which is inserted through the handle 10 and through the upper ends of the yoke bars 11, this rod passing through the opening ordinarily provided for one of the transverse bolts holding the yoke bars to the handle. The extremities of the transverse bar or rod 16 are reduced and provided with nuts 17 preventing any lateral movement of the arms 15. The arms 15 at their free ends carry a transverse shaft 18 and the nuts 19 and mounted upon this transverse shaft for movement therearound is a sleeve 20 carrying a cutting disk 21 having a diameter of five or six inches though obviously I do not wish to be limited thereto.

Also mounted upon this shaft at each end of the sleeve 20 are the rollers 22 which rotate freely upon the shaft independently of the disk 21 and are spaced from each other. I have illustrated two of these rollers 22 on each side of the disk, that is, between the disk and the arms 15 but in relatively wide lawn mowers three of these rollers will be used and in very narrow lawn mowers possibly only two rollers will be necessary. These rollers are designed to rest upon the grass or upon the margin of the lawn and upon the walk while the disk 21 operates to trim the grass or sod at the edge of the path.

Bracing the arms 15 from each other is a transverse rod 23 and for the purpose of holding the attachment raised and in inoperative position, I provide any suitable latch as for instance the latch illustrated in Figure 1 comprising a head 24, a shank 25 extending through the handle of the mower, and a spring 26 urging the shank inward. The head is undercut on its inner face so that when the attachment is turned back against the handle, the head may be drawn out against the action of the spring 26 and then turned to engage over the rod 23, thus locking the attachment raised. By this means also the attachment may be readily released for use.

In the use of the device, the attachment is turned downward and then the lawn mower is reversed so that the roller 13 and the cutting knives are upward. The disk 21 and the rollers 22 will, under these circumstances, support the whole weight of the lawn mower so that the weight of the lawn mower will act to force the cutting disk 21 into the sod, the extent of this cutting action being limited by the contact of the rollers 22 with the sod or with the sod and surface of the path.

The construction of my edger is such that the whole weight of the lawn mower is used to force the cutting disc thru the tough grass, roots, etc. No edger is a success if depending on strength of the operator to cut through the turf or if a light disc or discs are used, it will not work especially with heavy grass to cut and hard dry ground next to the walk or curb.

By reason of the fact that the machine is practically supported by the rollers 22 on each side of the disk, no balancing of the machine is necessary. My attachment can remain connected to the handle of the lawn mower and will not be in the way of either mowing or rolling the machine from one job to another. It uses all of the weight of the machine to force the blade through the turf. It is more easily guided because the machine is balanced and because the cutter is in the middle and not on one side. This will permit my attachment to be pushed in both directions and to cut on either side of the disk. Where the edger is so placed that cutting can only occur on one side of the disk, it forces the user to take a certain position on the walk or path before beginning to work. This is not necessary with my construction.

It is to be noted that the arms 15 are angularly bent just beyond the cross brace 23. Thus these arms are sufficiently offset at their lower ends so that when the arms are turned upward the brace rod 23 will come in contact with the handle 10 and be latched by the latch 24 with the disk supported in slightly spaced relation to the handle.

Obviously many minor changes may be made without departing from the spirit of the invention as defined in the appended claims.

I claim:—

1. The combination with a lawn mower having a handle, traction wheels, and a brace rod extending transversely across the mower inward of the traction wheels, of an edge cutting attachment comprising arms disposed one on each side of the handle and pivotally mounted thereon, the arms adapted to bear against said brace rod when the machine is inverted and the arms are lowered, and a cutting disk supported between the free extremities of said arms.

2. The combination with a lawn mower having a handle, traction wheels, and a brace rod extending transversely across the mower inward of the traction wheels, of an edge cutting attachment comprising arms disposed one on each side of the handle and pivotally mounted thereon, the arms adapted to bear against said brace rod when the machine is inverted and the arms are lowered, a cutting disk supported between the free extremities of said arms, and traction rollers disposed on opposite sides of the cutting disk.

3. The combination with a lawn mower having a handle, traction wheels, and a brace rod extending transversely across the mower inward of the traction wheels, of an edge cutting attachment comprising a supporting rod extending through the handle, arms pivotally carried upon said rod, a shaft connecting the free ends of the arms, a cutting disk mounted upon the shaft, traction rollers supported on the shaft on each side of the cutting disk, and means carried by the handle whereby the frame formed by the supporting arms may be locked against the handle in a raised position, the arms when lowered bearing against the transverse brace rod of the lawn mower.

4. An edge cutting attachment for lawn mowers comprising a pair of arms, a transverse member adapted to pass through the handle of the lawn mower and to which the arms are pivotally connected, a bolt connecting the free ends of the arms, a cutting disk rotatably mounted upon the bolt and spacing rollers disposed upon said bolt on each side of the traction wheels.

5. An edge cutting attachment for lawn mowers comprising a pair of arms, a transverse member adapted to pass through the handle of the lawn mower and to which the arms are pivotally connected, a bolt connecting the free ends of the arms, a cutting disk rotatably mounted upon the bolt, spacing rollers disposed upon said bolt on each side of the traction wheels, a brace rod connecting the two arms and a latch adapted to be mounted upon the handle of the lawn mower to engage said brace rod and hold the attachment raised.

6. The combination with a lawn mower, of an edge trimming attachment pivotally mounted upon the handle of the lawn mower for movement into position against the frame of the lawn mower, the attachment including a cutting disk and rollers on opposite sides of the disk and rotatable about the axis thereof whereby when the lawn mower is inverted, the whole weight of the lawn mower will come upon the disk.

In testimony whereof I hereunto affix my signature.

ANDREW E. BECK.